(No Model.) 2 Sheets—Sheet 1.
P. WRIGHT.
AQUASCOPE.
No. 378,126. Patented Feb. 21, 1888.
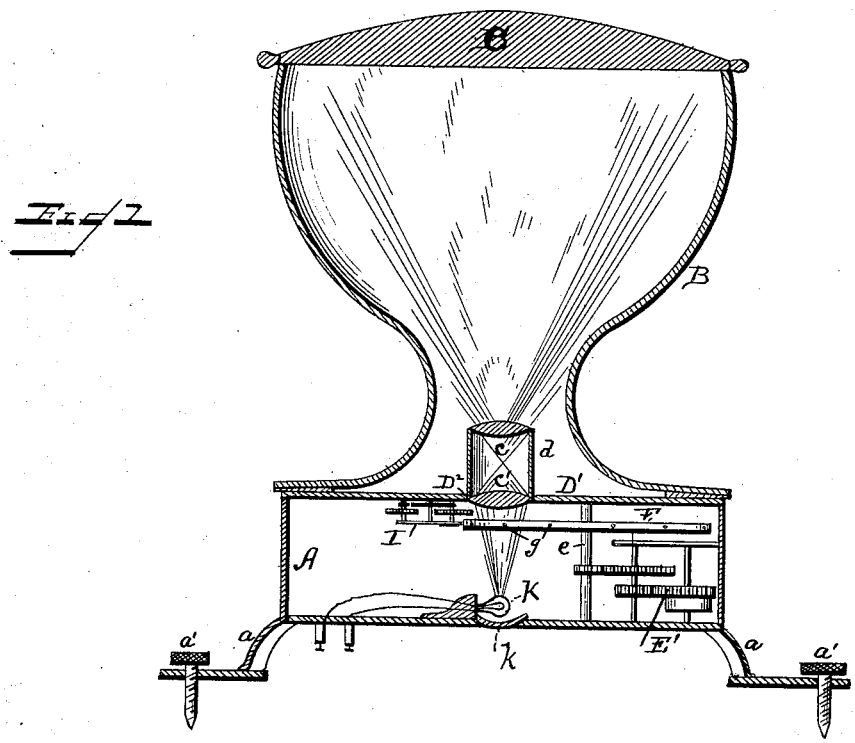
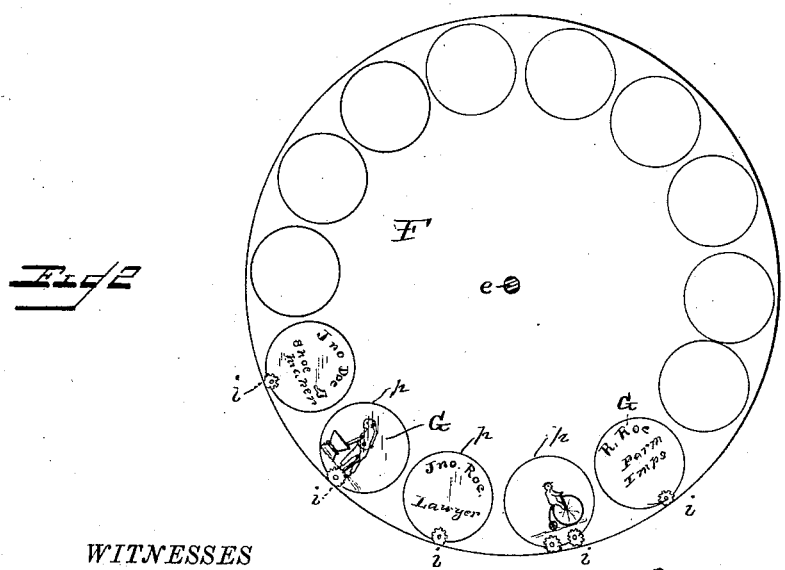
WITNESSES
INVENTOR (No Model.) 2 Sheets—Sheet 2.
P. WRIGHT.
AQUASCOPE.
No. 378,126. Patented Feb. 21, 1888.
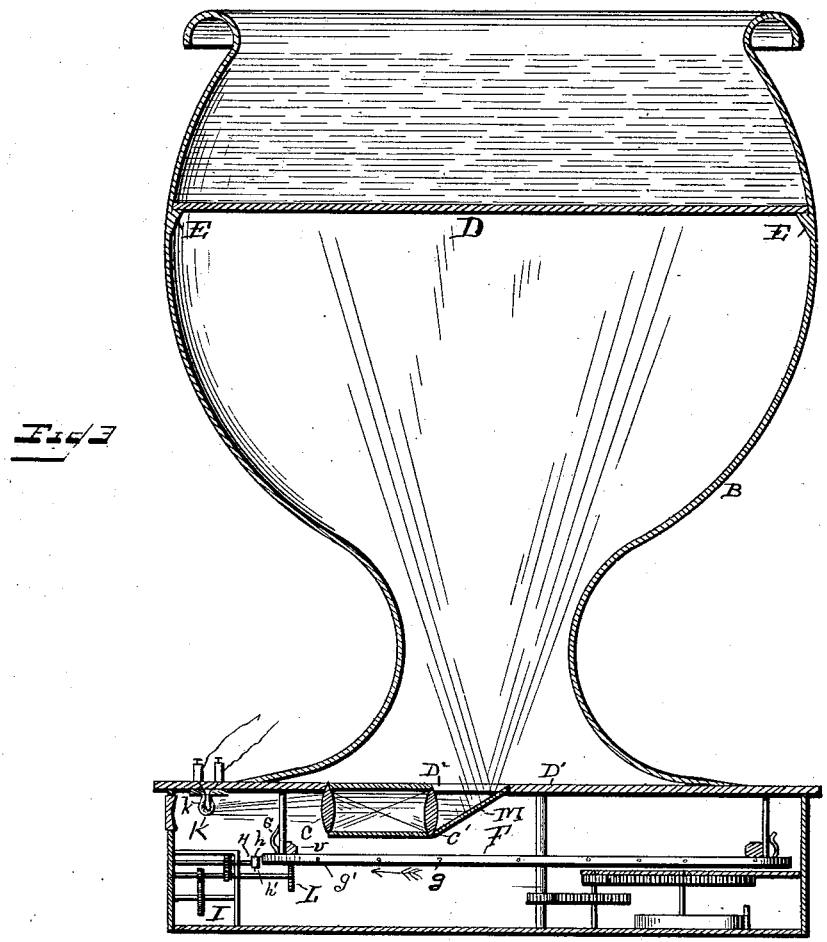
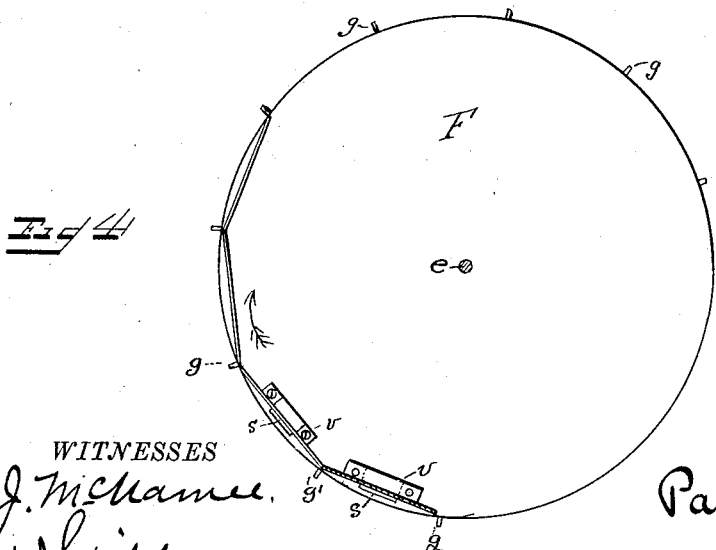
WITNESSES
J. McNamee
D. F. Gibbon
INVENTOR.
Parvin Wright.
H. A. Tunis. Attorney.

United States Patent Office.

PARVIN WRIGHT, OF DENVER, COLORADO, ASSIGNOR OF ONE-HALF TO CECILIA R. NORTHROP, OF SAME PLACE.

AQUASCOPE.

SPECIFICATION forming part of Letters Patent No. 378,126, dated February 21, 1888.

Application filed November 26, 1887. Serial No. 256,240. (No model.)

*To all whom it may concern:*

Be it known that I, PARVIN WRIGHT, a citizen of the United States, residing at Denver, in the county of Arapahoe and State of Colorado, have invented certain new and useful Improvements in Aquascopes; and I do delare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to advertising devices, and also to devices which may be exhibited in the parlor or elsewhere to afford amusement to members of families, visitors, and others. I denominate the invention an "aquascope."

The object of the invention is to provide an automatic apparatus for exhibiting pictures, either stationary or movable, and of exhibiting insects and other small objects, and to present the same in an entertaining and attractive manner; and with these ends in view the invention consists in the construction and novel combination of parts, as will be hereinafter fully described, and particularly pointed out in the claims.

In the drawings, Figure 1 is a vertical sectional view of an aquascope embodying the improvements of my invention. Fig. 2 is a plan view of the revolving picture-disk removed from place. Fig. 3 is a vertical sectional view of a modification of my improved aquascope, and Fig. 4 is a plan view of a modification of the revolving picture-disk detached.

Referring by letter to the accompanying drawings, A designates a hollow base, which is provided with legs or brackets $a$, having holes for the reception of screws $a'$, by which it may be securely fastened to any suitable support in either a vertical position or in a horizontal position, as may be most convenient or desirable. The hollow base A is provided with a vase-shaped hood, B, which latter terminates in a solid glass lens or disk, C, which is made plane on its lower side and convex on its upper side, as shown in Fig. 1. I may, however, and sometimes do, adopt the modified form shown in Fig. 3 of the drawings, wherein a plain disk, D, of glass ground on its lower face is supported within the hood B upon an inwardly-projecting ledge or rib, E, the space above the disk D being filled with water or any suitable transparent plain or colored fluid.

Instead of making the lens or disk C of solid glass, as above described, I may and sometimes do make this disk hollow and fill the space between the plain and convex sides thereof with water or suitable transparent plain or colored fluid.

D' is a diaphragm the center of which is provided with an opening, $D^2$, in which opening is secured a tube, $d$, containing the usual pair of convex lens, $c\ c'$.

E' is an ordinary train of clock-gearing, which serves to rotate the shaft $e$, said shaft being provided with a revolving disk, F, having a number of pictures, G, arranged in the form of a circle within the periphery or rim. The rim or edge of the disk F is provided with a series of radially-projecting pins, $g$, which pins mesh with or engage a set of similar pins, $h$, on a hub, H, said hub being driven by a spring-train of gearing, I, so that when the pin $h$ on the hub H releases the pin $g$ on the disk F the disk F will rotate in the direction of the arrow until the pin $g'$ on said disk comes in contact with the pin $h'$ on the hub H, and as this hub H is slowly revolving an intermittent rotary motion will be imparted to the disk F.

K is an incandescent lamp, which is provided with a reflector, $k$, by means of which the picture is illuminated and through the media of the lenses $c\ c'$ projected on the ground glass.

It is obvious that any kind of suitable light may be used in place of the incandescent lamp illustrated and mentioned.

In the event that it be desirable to show the picture in motion on the ground glass—as in the case of a bicycle running, the hands of a clock moving, or any other movable device—a small gear-wheel, $i$, on the picture meshes with a large gear-wheel, L, on the clock-work I and rotates or actuates the movable portion of the picture while it is being exhibited.

In the modification shown in Fig. 3 the same general idea is followed, except that the ground glass forms the bottom of a water-vase, through which the projected picture is viewed, and the light, picture, and lenses are mounted at a right angle to the ground glass, the rays being diverted to correspond by a plain mirror, M.

The revolving disk F is provided with a series of blocks, v, and springs s, so that the pictures p may be removably secured in place, as shown in Fig. 3.

Having thus fully described my invention, what I claim as new, and desire to secure by Letters Patent of the United States, is—

1. The combination, with the hollow base provided with a train of driving-gear and a diaphragm provided with a central opening having a tube adjacent thereto, said tube being provided with double lenses, of a revolving picture-disk located within the hollow base, a hood having a ground-glass receiving-plate, a lamp within the base, and mirrors for reflecting the rays from the lamp and the pictures upon the receiving-plate, substantially as set forth.

2. In an aquascope, the combination, with the hollow base, the picture-disk, and its actuating-train of gearing located therein, of the hood provided with the glass disk, the diaphragm having an opening in which is seated a tube having double lenses, and a lamp within the base for reflecting the pictures and rays of light upon the glass disk, substantially as specified.

3. The combination, with the hollow base containing the train of gearing, the picture-disk revolving therein, and the diaphragm having its apertures provided with a lens, of the hood provided with the ground-glass disk in its upper enlarged end, substantially as set forth.

4. The combination, with the hollow base containing the train of actuating-gearing, the revolving picture-disk located therein, the tube provided with the lenses located adjacent to an aperture in the diaphragm of the hollow base, of the lamp within the base, the hood, and the view-plate connected therewith, substantially as specified.

In testimony whereof I affix my signature in presence of two witnesses.

PARVIN WRIGHT.

Witnesses:
ROBERT B. WRIGHT,
L. C. NORTHROP.